US007445867B2

(12) United States Patent
Mitsuta et al.

(10) Patent No.: US 7,445,867 B2
(45) Date of Patent: *Nov. 4, 2008

(54) ELECTRODE STRUCTURE FOR SOLID-POLYMER TYPE FUEL CELL

(75) Inventors: Naoki Mitsuta, Wako (JP); Nagayuki Kanaoka, Wako (JP); Yoichi Asano, Wako (JP); Hiroshi Sohma, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 651 days.

This patent is subject to a terminal disclaimer.

(21) Appl. No.: 10/481,824

(22) PCT Filed: Jun. 21, 2002

(86) PCT No.: PCT/JP02/06222

§ 371 (c)(1),
(2), (4) Date: Dec. 23, 2003

(87) PCT Pub. No.: WO03/001622

PCT Pub. Date: Jan. 3, 2003

(65) Prior Publication Data

US 2004/0197631 A1    Oct. 7, 2004

(30) Foreign Application Priority Data

Jun. 25, 2001   (JP)   ............................ 2001-190735
Aug. 3, 2001    (JP)   ............................ 2001-237042

(51) Int. Cl.
*H01M 8/10*    (2006.01)

(52) U.S. Cl. .......................................... 429/46; 521/27
(58) Field of Classification Search ...................... None
See application file for complete search history.

(56) References Cited

U.S. PATENT DOCUMENTS 5,438,082 A      8/1995   Helmer-Metzmann et al.
6,825,310 B2 *  11/2004   Goto et al. .................... 528/86

(Continued)

FOREIGN PATENT DOCUMENTS

JP           06-093114 A       4/1994

(Continued)

OTHER PUBLICATIONS

Carey, Francis A. Organic Chemistry 4th ed. New York, 2000, p. 21.*

*Primary Examiner*—Susy Tsang-Foster
*Assistant Examiner*—Alix Echelmeyer
(74) *Attorney, Agent, or Firm*—Arent Fox LLP

(57) ABSTRACT

An electrode structure for a polymer electrolyte fuel cell comprises a pair of electrode catalyst layers and a polymer electrolyte membrane held between the electrode catalyst layers. The polymer electrolyte membrane is a sulfonation product of a polymer which comprises a main chain wherein two or more divalent aromatic residues are bound to one another directly or through oxy groups or divalent groups other than aromatic residues and side chains comprising aromatic groups to be sulfonated. The number of divalent aromatic residues comprised in the main chain of the above polymer is denoted by X, and the number of oxy groups comprised in the main chain of the above polymer is denoted by Y, and the value X/Y is within the range of from 2.0 to 9.0.

7 Claims, 3 Drawing Sheets

U.S. PATENT DOCUMENTS

2002/0061431 A1 * 5/2002 Koyama et al. ............... 429/33

FOREIGN PATENT DOCUMENTS

| JP | 09-087510 A | 3/1997 |
| JP | 10-021943 A | 1/1998 |
| JP | 11-116679 A | 4/1999 |
| JP | 2002-216798 A | 8/2002 |
| JP | 2002-216799 A | 8/2002 |
| WO | WO 99/10165 | 3/1999 |

* cited by examiner

ELECTRODE STRUCTURE FOR SOLID-POLYMER TYPE FUEL CELL

TECHNICAL FIELD

The present invention relates to an electrode structure used for a polymer electrolyte fuel cell.

BACKGROUND ART

The petroleum source is beginning to exhausted, and at the same time, environmental problems such as global warming due to the consumption of fossil fuel have increasingly become serious. Thus, a fuel cell receives attention as a clean power source for electric motors that is not accompanied with the generation of carbon dioxide. The above fuel cell has been widely developed, and some fuel cells have become commercially practical. When the above fuel cell is mounted in vehicles and the like, a polymer electrolyte fuel cell comprising a polymer electrolyte membrane is preferably used because it easily provides a high voltage and a large electric current.

As an electrode structure used for the above polymer electrolyte fuel cell, there has been known an electrode structure, which comprises a pair of electrode catalyst layers comprising a catalyst such as platinum supported by a catalyst carrier such as carbon black that is formed by integrating by an ion conducting polymer binder, a polymer electrolyte membrane capable of conducting ions sandwiched between the electrode catalyst layers, and a backing layer laminated on each of the electrode catalyst layers. When a separator acting also as a gas passage is further laminated on each of the electrode catalyst layers, the above electrode structure constitutes a polymer electrolyte fuel cell.

In the above polymer electrolyte fuel cell, one electrode catalyst layer is defined as a fuel electrode, and the other electrode catalyst layer is defined as an oxygen electrode. Now, reducing gas such as hydrogen or methanol is introduced into the fuel electrode through the above backing layer, whereas oxidizing gas such as air or oxygen is introduced into the oxygen electrode through the above backing layer. By this action, on the above fuel electrode side, protons are generated from the above reducing gas by the action of a catalyst contained in the above electrode catalyst layer. Then, the protons transfer to the electrode catalyst layer on the above oxygen electrode side through the above polymer electrolyte membrane. Thereafter, the protons are reacted with the above oxidizing gas introduced into the oxygen electrode by the action of the above catalyst contained in the electrode catalyst layer on the above oxygen electrode side, so as to generate water. Thus, the above fuel electrode is connected to the above oxygen electrode through using a conductor, so as to obtain electric current.

Previously, in the above electrode structures, a perfluoroalkylene sulfonic acid polymer (e.g., Nafion (trade name) from DuPont) has been widely used for the above polymer electrolyte membrane. The perfluoroalkylene sulfonic acid polymer is sulfonated, and accordingly it has an excellent proton conductivity. The compound also has a chemical resistance as a fluorocarbon resin. However, the compound has a problem in that it is extremely expensive.

Thus, the use of a relatively inexpensive ion conducting material instead of the perfluoroalkylene sulfonic acid polymer has been under study for constituting an electrode structure for a polymer electrolyte fuel cell. An example of the above inexpensive ion conducting material may include a hydrocarbon-based polymer.

However, the hydrocarbon-based polymer is poor in toughness, and so it is difficult to use it as a polymer electrolyte membrane to constitute the above electrode structure. In order to improve the toughness of the hydrocarbon-based polymer, for example, methods such as introducing a bending group into the main chain of the hydrocarbon-based polymer, or reducing the ion exchange capacity are being considered.

However, when the hydrocarbon-based polymer whose toughness is improved as described above is used for the polymer electrolyte membrane of the electrode structure, there is an inconvenience in that it is difficult to obtain a sufficient power generation efficiency. In addition, the hydrocarbon-based polymer is inconvenient in that it has a low oxidation resistance and it deteriorates rapidly.

DISCLOSURE OF THE INVENTION

It is an object of the present invention to solve such inconvenience and to provide an electrode structure for a polymer electrolyte fuel cell, which comprises a polymer electrolyte membrane having an excellent toughness and has an excellent power generation efficiency.

Moreover, it is another object of the present invention to provide an electrode structure for a polymer electrolyte fuel cell having an excellent oxidation resistance and an excellent power generation efficiency.

Furthermore, it is another object of the present invention to provide a polymer electrolyte fuel cell having an excellent power generation efficiency.

To eliminate the above inconvenience, the electrode structure for a polymer electrolyte fuel cell of the present invention comprises a pair of electrode catalyst layers and a polymer electrolyte membrane sandwiched between both the electrode catalyst layers, characterized in that the above polymer electrolyte membrane is a sulfonation product of a polymer, comprising a main chain, in which two or more divalent aromatic residues are bound to one another directly or through oxy groups or divalent groups other than aromatic residues, and side chains comprising aromatic groups to be sulfonated.

As a result of various studies regarding the above described hydrocarbon-based polymer constituting a polymer electrolyte membrane, the present inventors have found that a polymer electrolyte membrane having an excellent toughness can be obtained by setting the ratio between the number of divalent aromatic residues constituting the main chain of the above polymer and the number of oxy groups binding to the above aromatic residues within a specific range.

Thus, in the first aspect, the electrode structure for a polymer electrolyte fuel cell of the present invention is characterized in that, provided that the number of divalent aromatic residues comprised in the main chain of the above polymer is denoted by X, and the number of oxy groups comprised in the same above main chain is denoted by Y, the value X/Y is within the range between 2.0 and 9.0.

In the first aspect of the present invention, when the value X/Y that is the ratio between the unit number X of divalent aromatic residues comprised in the main chain of the above polymer and the unit number Y of oxy groups comprised in the same above main chain is within the range between 2.0 and 9.0, the above polymer electrolyte membrane can be excellent in toughness and ion conductivity. As a result, an electrode structure can be easily produced using the above polymer electrolyte membrane, and further, the obtained electrode structure can have an excellent power generation efficiency.

If the above X/Y is less than 2.0, the above polymer electrolyte membrane cannot obtain a sufficient ion conductivity. If the X/Y exceeds 9.0, it cannot obtain a sufficient toughness.

Moreover, as a result of various studies regarding the above described hydrocarbon-based polymer constituting a polymer electrolyte membrane, the present inventors have found that the level of hydrophobicity of the above hydrocarbon-based polymer can be expressed by a function that uses the number of groups containing an aromatic group to be sulfonated in a side chain thereof, the number of divalent aromatic residues that cannot be sulfonated, and the number of oxy groups with respect to the total groups comprised in the main chain of the above polymer, and that a hydrocarbon-based polymer having an excellent oxidation resistance can be obtained by setting the above level of hydrophobicity within a certain range. They have also found that a polymer electrolyte membrane having an excellent power generation efficiency can be obtained by sulfonating the above hydrocarbon-based polymer whose hydrophobic level is within a certain range and thereby imparting a certain ion exchange capacity.

Thus, in the second aspect, the electrode structure for a polymer electrolyte fuel cell of the present invention is characterized in that, provided that the number of groups to be sulfonated is denoted by A, the number of nonsulfonated divalent aromatic residues is denoted by B, and the number of oxy groups is denoted by C with respect to the total groups comprised in the main chain of the above polymer, the value (B/C)×(B+C)−A is within the range between 35 and 380.

In the second aspect of the present invention, the hydrophobic level of the above polymer is represented as the difference between the hydrophilic level and the hydrophobic level of the above polymer. The hydrophilic level is herein represented by the number of groups to be sulfonated A with respect to the total groups contained in the main chain of the above polymer.

On the other hand, the hydrophobic level relates to the number of nonsulfonated divalent aromatic residues B and the number of oxy groups C with respect to the total groups contained in the main chain of the above polymer. As the ratio B/C of the number of nonsulfonated divalent aromatic residues B to the number of oxy groups C becomes great and the sum of both numbers B+C also becomes great, the hydrophobic level becomes high. Hence, the above hydrophobic level is represented by (B/C)×(B+C).

As a result, the hydrophobic level of the above polymer is represented by formula (I) indicated below. It should be noted that, in the present description, hereinafter the above "hydrophobic level" is referred to as a "hydrophobic index."

Hydrophobic index=(B/C)×(B+C)−A  (I)

In the second aspect of the present invention, when an electrode structure for a polymer electrolyte fuel cell comprises a polymer electrolyte membrane obtained by sulfonating the above polymer having a hydrophobic index within the range between 35 and 380, the electrode structure becomes excellent in oxidation resistance and power generation efficiency. If the hydrophobic index is less than 35 or more than 380, a sufficient oxidation resistance cannot be obtained.

In each of the above aspects of the present invention, the main chain of the above polymer comprises a first repeating unit represented by the following general formula (1) and a second repeating unit represented by the following general formula (2), and it may further comprise a third repeating unit represented by the following general formula (3):

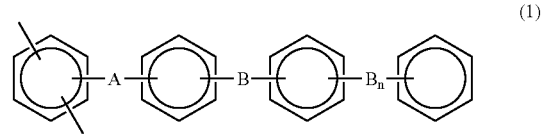

(1)

wherein A represents an electron attracting group, B represents an electron releasing group, n is an integer of 0 or 1, and a benzene ring includes a derivative thereof,

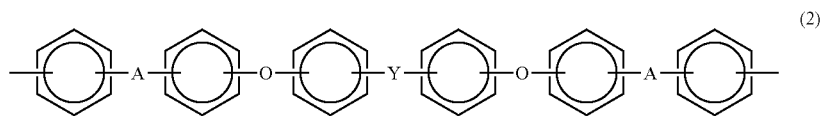

(2)

wherein A represents an electron attracting group, Y represents —C(CF$_3$)$_2$— or —SO$_2$—, and a benzene ring includes a derivative thereof, and

(3)

wherein B represents an electron releasing group.

It should be noted that the term "electron attracting group" is used in the present description to mean a divalent group such as —CO—, —CONH—, —(CF$_2$)p- (wherein p is an integer of 1 to 0), —C(CF$_3$)$_2$—, —COO—, —SO— or —SO$_2$—, in which the Hammett substituent constant is 0.06 or greater in the meta position of a phenyl group and it is 0.01 or greater in the para position thereof. It should be also noted that the term "electron releasing group" is used herein to mean a divalent group such as —O—, —S—, —CH═CH—, or —C≡C—.

Herein; sulfonation occurs only to a benzene ring to which no electron attracting group binds. Accordingly, when a polymer of which main chain comprises the first repeating unit represented by general formula (1) and the second repeating unit represented by general formula (2) is sulfonated, no sulfonic acid group is introduced either onto any benzene ring of the first repeating unit, which belongs to the main chain or any benzene ring of the second repeating unit, but it is only introduced onto benzene rings belonging to the side chain of the first repeating unit. Thus, in the above polymer, the molar ratio between the first repeating unit and the second repeating unit is adjusted to control the amount of the introduced sulfonic acid groups, so that the ion conductivity of a polymer electrolyte membrane can be adjusted.

In addition, the main chain of the above polymer comprises the third repeating unit represented by general formula (3) as well as the first repeating unit represented by general formula (1) and the second repeating unit represented by general formula (2), so that, in the first aspect, the electrode structure can adopt a structure which imparts a bending ability to the polymer without introducing a sulfonic acid group, while controlling the number of oxy groups. Otherwise, in the second aspect, while controlling the number of oxy groups C, the number of nonsulfonated divalent aromatic residues B is allowed to increase, so that the hydrophobic index can be controlled.

The electrode structure in each of the above aspects of the present invention constitutes a polymer electrode fuel cell, which generates power, when oxidizing gas is supplied to one side of the above electrode structure and reducing gas to the other side.

BEST MODE FOR CARRYING OUT THE INVENTION

Figure 1:
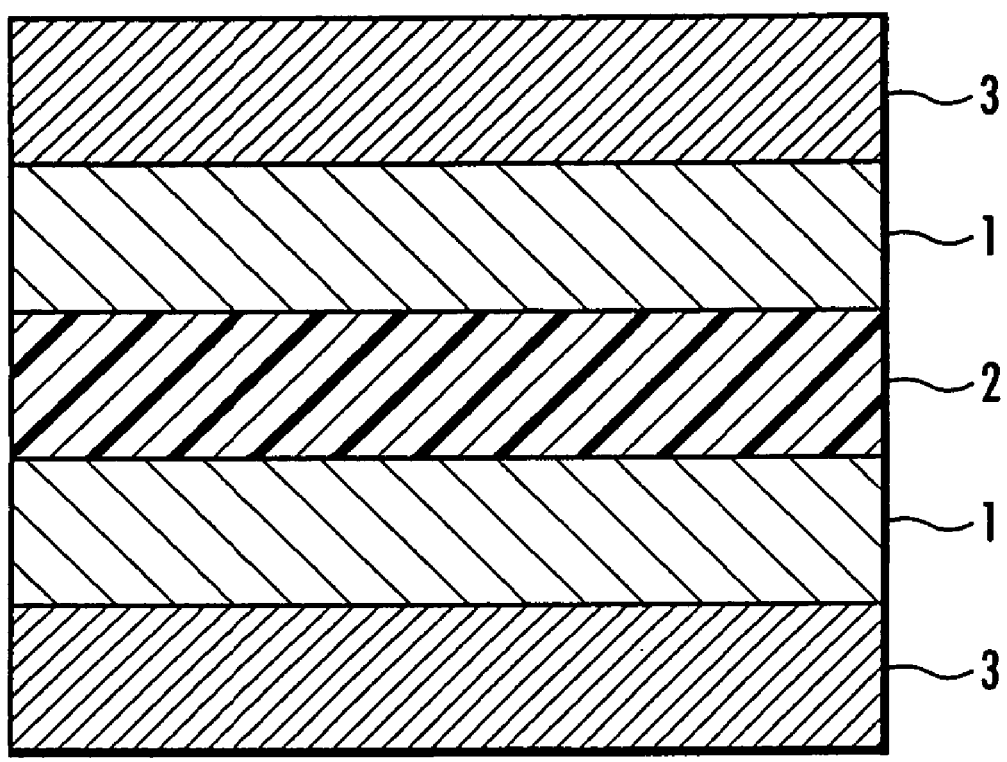
FIG. 1 is an illustrative sectional view of the electrode structure of the present invention.

As shown in FIG. 1, the electrode structure of a first embodiment of the present invention comprises a pair of electrode catalyst layers 1, 1, a polymer electrolyte membrane 2 sandwiched between both the electrode catalyst layers 1, 1, and backing layers 3, 3 laminated on the electrode catalyst layers 1, 1 respectively.

The electrode catalyst layer 1 is produced by screen printing a catalyst paste consisting of a catalyst particle and an ion conducting polymer binder on the backing layer 3, so that a certain amount (e.g., 0.5 mg/cm$^2$) of catalyst is kept thereon, and then drying it. The above catalyst particle consists of a platinum particle that is supported by carbon black (furnace black) at a certain weight ratio (e.g., carbon black:platinum=1:1). The above catalyst paste is prepared by uniformly dispersing the above catalyst particles in a solution containing an ion conducting polymer binder such as a perfluoroalkylene sulfonic acid polymer (e.g., Nafion (trade name) from DuPont) at a certain weight ratio (e.g., catalyst particle:binder solution=1:1).

The backing layer 3 consists of a substrate layer and a carbon paper. The above substrate layer is formed by mixing carbon black and polytetrafluoroethylene (PTFE) particles at a certain weight ratio (e.g., carbon black:PTFE particle=4:6), uniformly dispersing the obtained mixture in a solvent such as ethylene glycol so as to obtain a slurry, and applying the slurry on the one side of the above carbon paper followed by drying it. The catalyst paste screen printed on the backing layer 3 is dried, for example, by drying at 60° C. for 10 minutes and then vacuum drying at 120° C. for 60 minutes.

The polymer electrolyte membrane 2 is a sulfonate of a copolymer obtained by polymerizing a first repeating unit represented by general formula (1) indicated below and a second repeating unit represented by general formula (2) indicated below at a predetermined molar ratio. Alternatively, the polymer electrolyte membrane 2 is a sulfonation product a copolymer obtained by polymerizing the first repeating unit represented by the same general formula (1) indicated below, the second repeating unit represented by the same general formula (2) indicated below, and a third repeating unit represented by general formula (3) indicated below at a predetermined molar ratio:

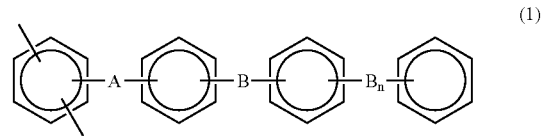

(1)

wherein A represents an electron attracting group, B represents an electron releasing group, n is an integer of 0 or 1, and a benzene ring includes a derivative thereof,

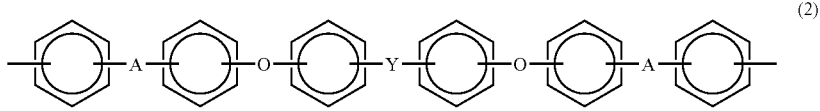

(2)

wherein A represents an electron attracting group, Y represents —C(CF$_3$)$_2$— or —SO$_2$—, and a benzene ring includes a derivative thereof, and

(3)

wherein B represents an electron releasing group.

An example of a monomer used as the first repeating unit represented by the above general formula (1) includes 2,5-dichloro-4'-(4-phenoxyphenoxy)benzophenone represented by the following formula (4).

Examples of a monomer used as the second repeating unit represented by the above general formula (2) include 2,2-bis[4-{4-(4-chlorobenzoyl)phenoxy}phenyl]-1,1,1,3,3,3-hexafluoropropane represented by the following formula (5) and 2-bis[4-{4-(4-chlorobenzoyl)phenoxy}phenyl]sulfone represented by the following formula (6):

An example of a monomer used as the second repeating unit represented by the above general formula (3) may include 4,4'-dichlorobenzophenone.

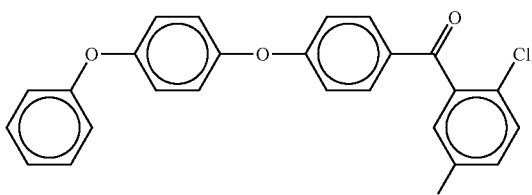

(4)

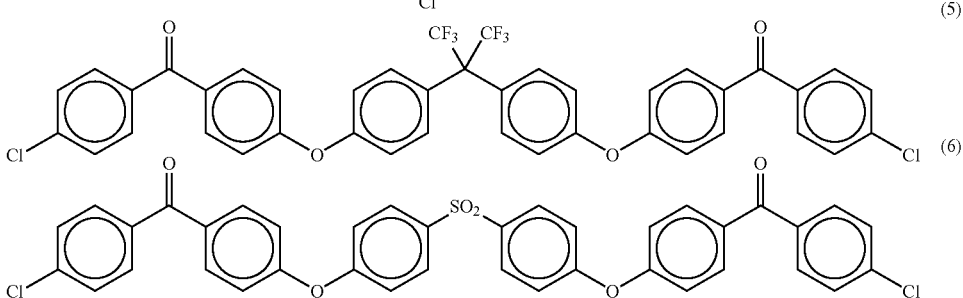

(5)

(6)

The above copolymer preferably has a polymer molecular weight of 10,000 to 1,000,000 at a weight-average molecular weight shown using polystyrene conversion. If the above polymer molecular weight is less than 10,000, a mechanical strength that is preferable as a polymer electrolyte membrane might not be obtained. If it exceeds 1,000,000, as described later, when the polymer is dissolved in a solvent to form a membrane, the dissolubility decreases or the viscosity of the solution increases, and thereby it becomes difficult to treat the polymer.

Thereafter, concentrated sulfuric acid is added to the above copolymer for sulfonation, such that it contains a sulfonic acid group within the range between 0.5 and 3.0 mg equivalent/g. If the obtained sulfonation product contains less than 0.5 mg equivalent/g of sulfonic acid group, it cannot obtain a sufficient ion conductivity. If the content of a sulfonic acid group exceeds 3.0 mg equivalent/g, a sufficient toughness cannot be obtained, and it makes difficult to treat the sulfonate during the production of an electrode structure, which will be described later.

The sulfonation product of the above copolymer is then dissolved in N-methylpyrrolidone to prepare a polymer electrolyte solution. Thereafter, a membrane is formed from the polymer electrolyte solution by the cast method followed by drying in an oven, so as to prepare, for example, the polymer electrolyte membrane having a dry film thickness of 50 μm.

The electrode structure as shown in FIG. 1 is obtained by holding the polymer electrolyte membrane 2 between the electrode catalyst layers 1 of the above electrodes followed by hot pressing. The hot pressing is carried out, for example, at 150° C. at 2.5 MPa for 1 minute.

When a separator acting also as a gas passage is further laminated on each of the backing layers 3, 3, the electrode structure as shown in FIG. 1 constitutes a polymer electrolyte fuel cell, which generates power by supplying oxidizing gas to one side of the above electrode structure and reducing gas to the other side.

In the present embodiment, in the above copolymer that is a polymer constituting the polymer electrolyte membrane 2, when the number of divalent aromatic residues comprised in its main chain is denoted by X, and the number of oxy groups (—O—) comprised in its main chain is denoted by Y, the value X/Y is within the range between 2.0 and 9.0, so that the above polymer electrolyte membrane can obtain an excellent toughness and an excellent ion conductivity.

Next, a method of calculating the value X/Y will be explained below.

For example, 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) are polymerized at a molar ratio of p:q:r, so as to obtain a copolymer represented by the following formula (7):

(7)

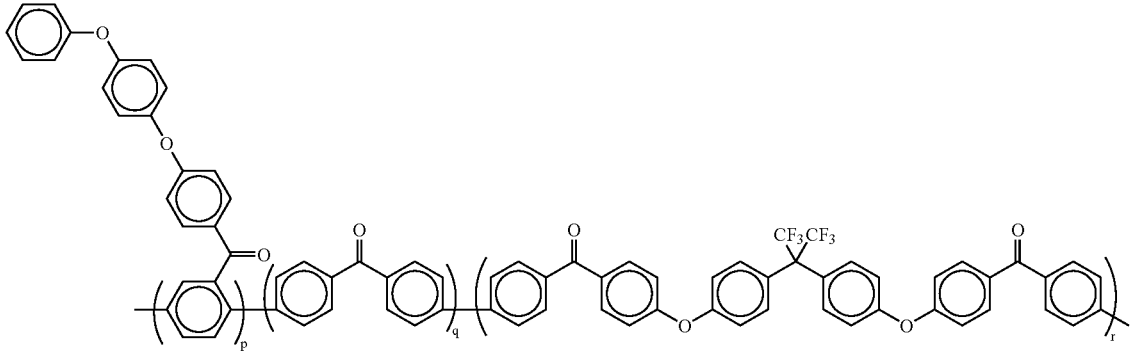

Herein, in the main chain of the copolymer of the above formula (7), the above first repeating unit comprises only divalent residues of 4'-(4-phenoxyphenoxy)benzophenone, and so it comprises one divalent aromatic residue and no oxy group. Moreover, the above second repeating unit comprises six phenylene groups (—$C_6H_4$—) as divalent aromatic residues and two oxy groups. Furthermore, in the main chain of the copolymer of the above formula (7), the above third repeating unit comprises two phenylene groups (—$C_6H_4$—) as divalent aromatic residues and no oxy group.

Next, a method of calculating the above hydrophobic index will be explained below.

For example, 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) are polymerized at a molar ratio of p:q:r, so as to obtain a copolymer represented by the following formula (7):

(7)

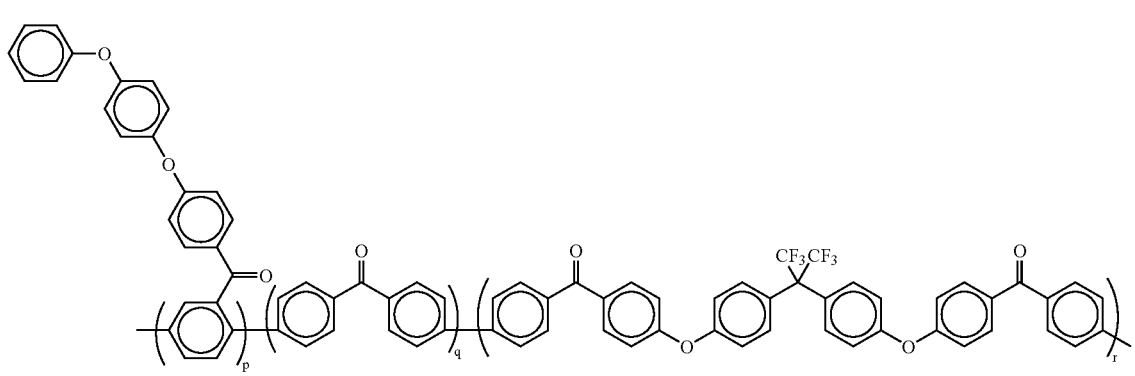

Accordingly, in the main chain of the copolymer of the above formula (7), the number of divalent aromatic residues X can be calculated using the formula X=1×p+6×r+2×q, and the number of oxy groups Y can be calculated using the formula Y=2×r. As a result, the value X/Y is calculated using the following formula (II):

$$X/Y = (1 \times p + 6 \times r + 2 \times q)/2 \times r \quad (II)$$

Next, in the electrode structure in the second embodiment of the present invention, when the number of groups to which aromatic groups to be sulfonated bind as side chains is denoted by A, the number of nonsulfonated divalent aromatic residues is denoted by B, and the number of oxy groups is denoted by C with respect to the total groups comprised in the main chain of the above copolymer that is a polymer constituting the polymer electrolyte membrane 2, a value of the hydrophobic index represented by the formula, (B/C)×(B+C)−A, is within the range of from 35 to 380. Except for the above difference, the electrode structure in the second embodiment of the present invention has a structure completely identical to the electrode structure in the first embodiment as shown in FIG. 1. In the present embodiment, in the above copolymer that is a polymer constituting the polymer electrolyte membrane 2, the hydrophobic index is within the above range, so that the above polymer electrolyte membrane can obtain an excellent oxidation resistance.

Moreover, when a separator acting also as a gas passage is further laminated on each of the backing layers 3, 3, the electrode structure in the present embodiment constitutes a polymer electrolyte fuel cell, which generates power by supplying oxidizing gas to one side of the above electrode structure and reducing gas to the other side.

Herein, sulfonation occurs only with respect to a benzene ring to which an electron attracting group does not bind. Accordingly, in the copolymer of the above formula (7), a sulfonic acid group is only introduced into a benzene ring of the side chain of the first repeating unit. Since the first repeating unit itself is a group in the main chain of the above copolymer, the number of groups to be sulfonated A=p.

In the copolymer of the above formula (7), a divalent aromatic residue means a benzene ring in each repeating unit. Accordingly, the number of nonsulfonated divalent aromatic residues is 0 in the first repeating unit, 2 in the third repeating unit, and 6 in the second repeating unit. Therefore, the number of nonsulfonated divalent aromatic residues B=2q+6r. Further, in the copolymer of the above formula (7), the number of oxy groups is 0 in the first and third repeating units, and 2 in the second repeating unit. Therefore, the number of oxy groups C=2r.

As a result, the hydrophobic index is calculated using the following formula (III):

$$(B/C) \times (B+C) - A = \{(2q+6r)/2r\} \times (2q+8r) - p \quad (III)$$

Next, the present invention will be described in the following examples and comparative examples.

EXAMPLE 1

In the present example, first, 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:2:2, so as to obtain a copolymer (p:q:r=6:2:2) represented by the following formula (7):

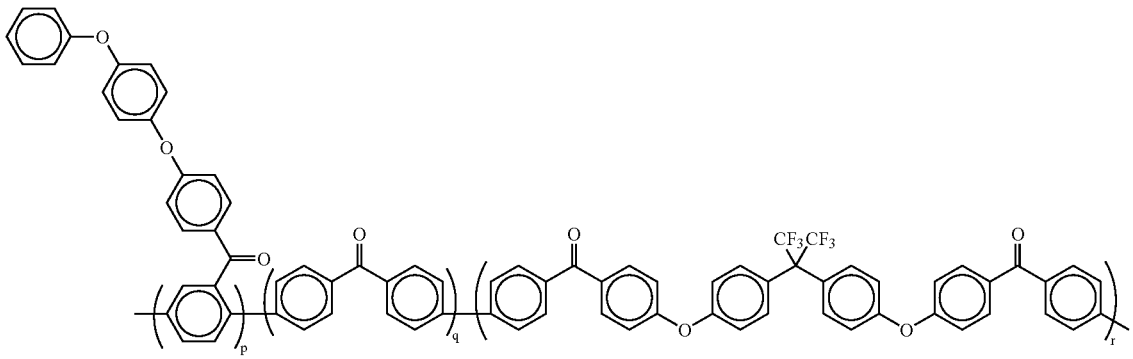

(7)

Thereafter, concentrated sulfuric acid was added to the above copolymer for sulfonation, so as to obtain a sulfonation product having an ion exchange capacity of 2.0 meq/g. Thereafter, the sulfonate of the above copolymer was dissolved in N-methylpyrrolidone to prepare a polymer electrolyte solution. A membrane was formed from the polymer electrolyte solution by the cast method followed by drying in an oven, so as to prepare a membrane having a dry film thickness of 50 μm, and the membrane was used as the polymer electrolyte membrane 2.

Subsequently, a platinum particle was supported by carbon black (furnace black) at a weight ratio of carbon black:platinum=1:1, so as to prepare a catalyst particle. Then, using a solution containing a perfluoroalkylene sulfonic acid polymer (e.g., Nafion (trade name) from DuPont) as an ion conducting polymer binder, the above catalyst particles were uniformly mixed in the binder at a weight ratio of binder:carbon black=1:1, so as to prepare a catalyst paste.

Thereafter, carbon black was mixed with polytetrafluoroethylene (PTFE) particles at a weight ratio of carbon black:PTFE particle=4:6. The obtained mixture was uniformly dispersed in a solvent such as ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and the carbon paper.

Thereafter, the above catalyst paste was screen printed on each of the above backing layers 3, so that 0.5 mg/cm2 platinum was kept thereon. Then, drying was carried out so as to prepare an electrode catalyst layer 1. Thus, a pair of electrodes were prepared, each of which consisted of the electrode catalyst layer 1 and the backing layer 3.

Thereafter, the polymer electrolyte membrane 2 was held between the electrode catalyst layers 1 of the above electrodes, and they were hot pressed to form the electrode structure as shown in FIG. 1.

In the present example, since p:q:r=6:2:2, X=22 and Y=4. Accordingly, X/Y=5.5 according to the above formula (II).

Subsequently, regarding the electrode structure in the present example, the toughness and ion conductivity of the polymer electrolyte membrane 2, and the power generation efficiency of the electrode structure were evaluated.

The polymer electrolyte membrane 2 was processed in a dumbbell rated to JIS 7, and the tensile elongation at break was measured under the conditions of a distance between chucks of 20 mm, a crosshead speed of 50 mm/min, a temperature of 25° C. and a relative humidity of 50%. The obtained tensile elongation at break was defined as toughness.

Figure 2:
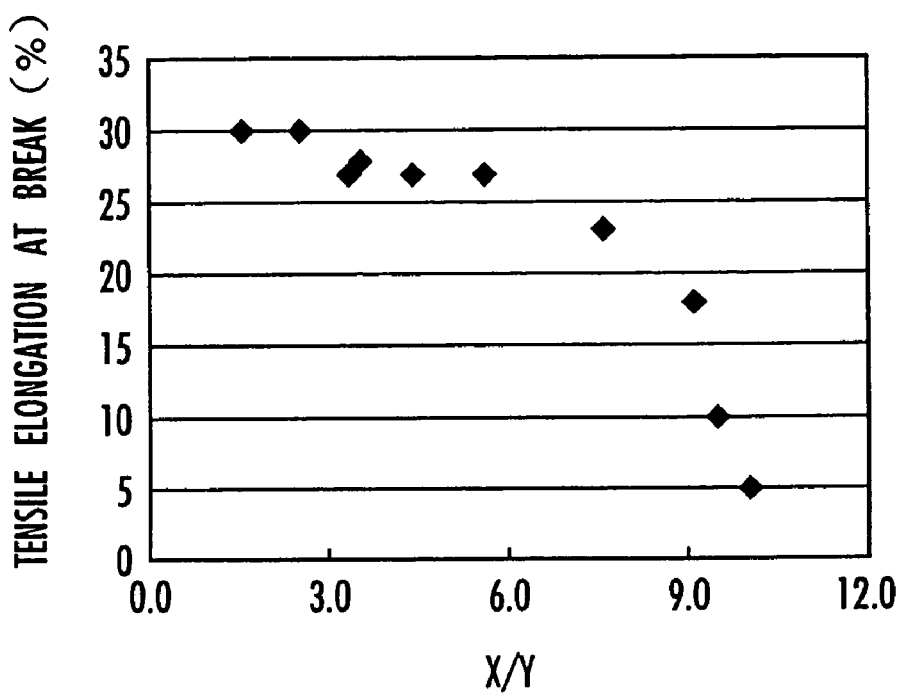
FIG. 2 is a graph showing the relationship between the value X/Y and the toughness of the polymer electrolyte membrane.

The results are shown in Table 1. The relationship between the value X/Y and the toughness (tensile elongation at break) is shown in FIG. 2.

Figure 3:
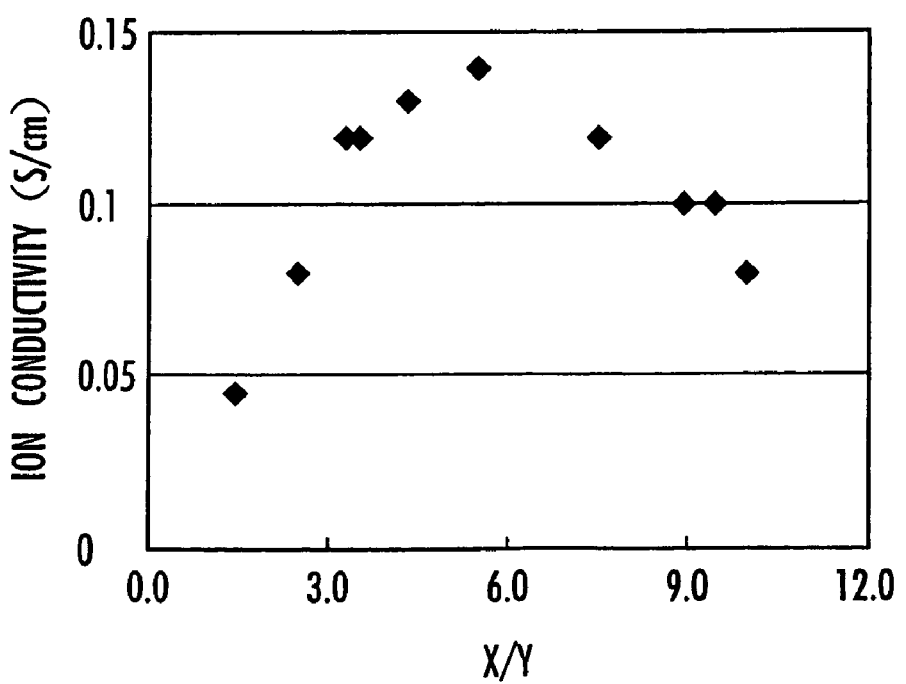
FIG. 3 is a graph showing the relationship between the value X/Y and the ion conductivity of the polymer electrolyte membrane.

Regarding the ion conductivity, the polymer electrolyte membrane 2 was held between two platinum electrodes, and the ion conductivity of the membrane was then measured by the alternating two-terminal method (frequency: 10 kHz) under the conditions of a temperature of 85° C. and a relative humidity of 90%. The results are shown in Table 1. The relationship between the value X/Y and the ion conductivity is shown in FIG. 3.

The power generation efficiency was evaluated as follows. The above electrode structure was used for a single cell. Air was supplied to one backing layer 3 as an oxygen electrode, whereas pure hydrogen was supplied to the other backing layer 3 as a fuel electrode, so as to generate electric power. Power generation conditions were a temperature of 90° C., a relative humidity of 50% on the fuel electrode side, and a relative humidity of 80% on the oxygen electrode side. The cell voltage was measured at a current density of 0.5 A/cm$^2$. If the measured cell voltage was 0.4 V or greater, it was evaluated that the cell had a good power generation efficiency. The results are shown in Table 1.

EXAMPLE 2

In the present example, the electrode structure as shown in FIG. 1 was obtained completely in the same manner as in Example 1 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:3:1, so as to obtain a copolymer (p q:r=6:3:1) represented by the above formula (7).

In the present example, since p:q:r=6:3:1, X=18 and Y=2. Accordingly, X/Y=9.0 according to the above formula (II).

Subsequently, regarding the electrode structure in the present example, the toughness, the ion conductivity, and the power generation efficiency were evaluated in the same manner as in Example 1. The results are shown in Table 1 and FIGS. 2 and 3.

EXAMPLE 3

In the present example, the electrode structure as shown in FIG. 1 was obtained completely in the same manner as in Example 1 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:1:3, so as to obtain a copolymer (p:q:r=6:1:3) represented by the above formula (7).

In the present example, since p:q:r=6:1:3, X=26 and Y=6. Accordingly, X/Y=4.3 according to the above formula (II).

Subsequently, regarding the electrode structure in the present example, the toughness, the ion conductivity, and the power generation efficiency were evaluated in the same manner as in Example 1. The results are shown in Table 1 and FIGS. 2 and 3.

EXAMPLE 4

In the present example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 5:5, while not using 4,4'-dichlorobenzophenone (the third repeating unit) at all, so as to obtain a copolymer (p:r=5:5) represented by formula (8) indicated below. Then, the sulfonation product of the obtained copolymer was used as the polymer electrolyte membrane 2. Except for the above difference, the electrode structure as shown in FIG. 1 was obtained completely in the same manner as in Example 1.

EXAMPLE 5

In the present example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 9:1, while not using 4,4'-dichlorobenzophenone (the third repeating unit) at all, so as to obtain a copolymer (p:r=9:1) represented by the above formula (8). Then, the sulfonation product of the obtained copolymer was used as the polymer electrolyte membrane 2. Except for the above difference, the electrode structure as shown in FIG. 1 was obtained completely in the same manner as in Example 1.

In the present example, since p:r=9:1 and q=0, X=15 and Y=2. Accordingly, X/Y=7.5 according to the above formula (II).

Subsequently, regarding the electrode structure in the present example, the toughness, the ion conductivity, and the power generation efficiency were evaluated in the same manner as in Example 1. The results are shown in Table 1 and FIGS. 2 and 3.

EXAMPLE 6

In the present example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above

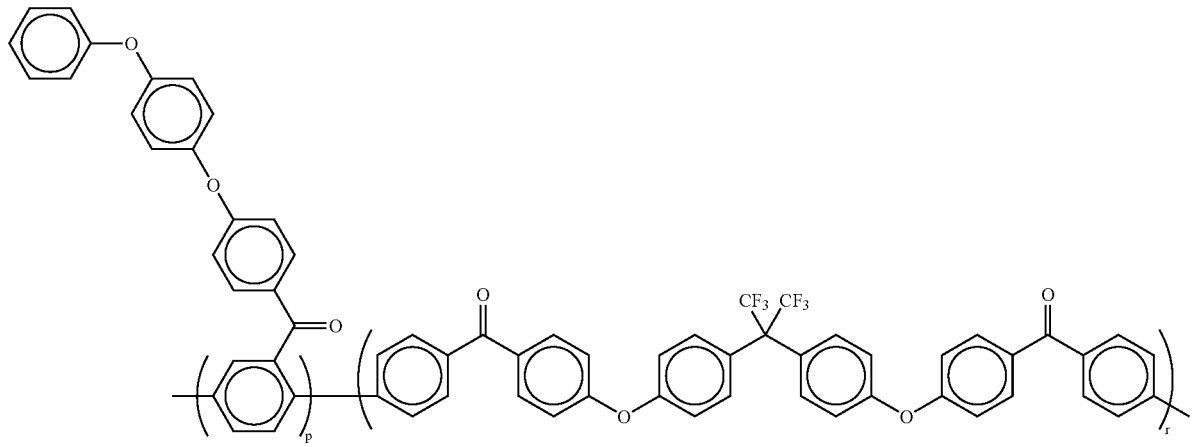

(8)

The copolymer of formula (8) corresponds to the case of q=0 in the above copolymer of formula (7). Accordingly, X, Y, and X/Y can be calculated in the same manner as in Example 1. In the present example, since p:r=5:5 and q=0, X=35 and Y=10. Accordingly, X/Y=3.5 according to the above formula (II).

Subsequently, regarding the electrode structure in the present example, the toughness, the ion conductivity, and the power generation efficiency were evaluated in the same manner as in Example 1. The results are shown in Table 1 and FIGS. 2 and 3.

formula (5) at a molar ratio of 9:15, while not using 4,4'-dichlorobenzophenone (the third repeating unit) at all, so as to obtain a copolymer (p:r=9:15) represented by the above formula (8). Then, the sulfonation product of the obtained copolymer was used as the polymer electrolyte membrane 2. Except for the above difference, the electrode structure as shown in FIG. 1 was obtained completely in the same manner as in Example 1.

In the present example, since p:r=9:15 and q=0, X=99 and Y=30. Accordingly, X/Y=3.3 according to the above formula (II).

Subsequently, regarding the electrode structure in the present example, the toughness, the ion conductivity, and the power generation efficiency were evaluated in the same manner as in Example 1. The results are shown in Table 1 and FIGS. 2 and 3.

EXAMPLE 7

In the present example, the electrode structure as shown in FIG. 1 was obtained completely in the same manner as in Example 1 with the exception that a polyether copolymer represented by formula (9) indicated below was used instead of the copolymer represented by the above formula (7), and that a sulfonation product having an ion exchange capacity of 1.5 meq/g obtained by adding concentrated sulfuric acid to the polyether copolymer for sulfonation was used as the polymer electrolyte membrane 2.

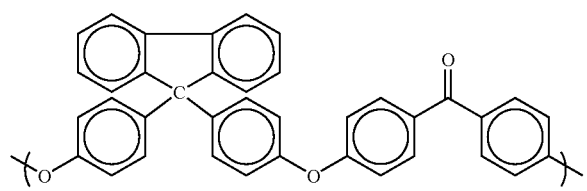

(9)

The main chain of the polyether copolymer of the above formula (9) contains four phenylene groups as divalent aromatic residues and two oxy groups. Accordingly, in the present example, X=4, Y=2, and X/Y=2.0.

Subsequently, regarding the electrode structure in the present example, the toughness, the ion conductivity, and the power generation efficiency were evaluated in the same manner as in Example 1. The results are shown in Table 1 and FIGS. 2 and 3.

COMPARATIVE EXAMPLE 1

In the present comparative example, the electrode structure as shown in FIG. 1 was obtained completely in the same manner as in Example 1 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 5:4:1, so as to obtain a copolymer (p:q:r=5:4:1) represented by the above formula (7).

In the present comparative example, since p:q r=5:4:1, X=19 and Y=2. Accordingly, X/Y=9.5 according to the above formula (II).

Subsequently, regarding the electrode structure in the present comparative example, the toughness, the ion conductivity, and the power generation efficiency were evaluated in the same manner as in Example 1. The results are shown in Table 1 and FIGS. 2 and 3.

COMPARATIVE EXAMPLE 2

In the present comparative example, the electrode structure as shown in FIG. 1 was obtained completely in the same manner as in Example 1 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 4:5:1, so as to obtain a copolymer (p:q:r=4:5:1) represented by the above formula (7).

In the present comparative example, since p:q:r=4:5:1, X=20 and Y=2. Accordingly, X/Y=10.0 according to the above formula (II).

Subsequently, regarding the electrode structure in the present comparative example, the toughness, the ion conductivity, and the power generation efficiency were evaluated in the same manner as in Example 1. The results are shown in Table 1 and FIGS. 2 and 3.

COMPARATIVE EXAMPLE 3

In the present comparative example, the electrode structure as shown in FIG. 1 was obtained completely in the same manner as in Example 1 with the exception that polyether ether ketone represented by formula (10) indicated below was used instead of the copolymer represented by the above formula (7), and that a sulfonate having an ion exchange capacity of 1.5 meq/g was obtained by adding concentrated sulfuric acid to the polyether ether ketone for sulfonation and it was used as the polymer electrolyte membrane 2.

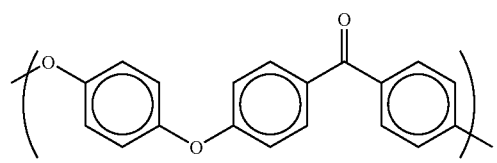

(10)

The main chain of the polyether ether ketone of the above formula (10) contains three phenylene groups as divalent aromatic residues and two oxy groups. Accordingly, in the present comparative example, X=3, Y=2, and X/Y=1.5.

Subsequently, regarding the electrode structure in the present comparative example, the toughness, the ion conductivity, and the power generation efficiency were evaluated in the same manner as in Example 1. The results are shown in Table 1 and FIGS. 2 and 3.

TABLE 1

| | X/Y | Tensile elongation at break (%) | Ion conductivity (S/cm) | Power generation efficiency |
|---|---|---|---|---|
| Example 1 | 5.5 | 27 | 0.14 | G |
| Example 2 | 9.0 | 18 | 0.1 | G |
| Example 3 | 4.3 | 27 | 0.13 | G |
| Example 4 | 3.5 | 28 | 0.12 | G |
| Example 5 | 7.5 | 23 | 0.12 | G |
| Example 6 | 3.3 | 27 | 0.12 | G |
| Example 7 | 2.0 | 30 | 0.08 | G |
| Comparative Example 1 | 9.5 | 10 | 0.1 | G |
| Comparative Example 2 | 10.0 | 5 | 0.08 | G |
| Comparative Example 3 | 1.5 | 30 | 0.045 | P |

Power generation efficiency:
G . . . A cell voltage of 0.4 V or greater at a current density of 5 A/cm$^2$
P . . . A cell voltage of less than 0.4 V at a current density of 5 A/cm$^2$ In the electrode structures of Examples 1 to 7, the value X/Y that is the ratio between the number X of divalent aromatic residues comprised in the main chain of the polymer forming the polymer electrolyte membrane 2 and the number Y of oxy groups comprised in the same above main chain is within the range between 2.0 and 9.0. As is clear from the results shown in Table 1 and FIGS. 2 and 3, these electrode structures all comprise the polymer electrolyte membrane 2 that is excellent in toughness (tensile elongation at break) and ion conductivity, and further, they have a good power generation efficiency.

In contrast, the electrode structures of Comparative Examples 1 and 2 in which the above X/Y in the main chain of the polymer constituting the polymer electrolyte membrane 2 exceeds 9.0 are excellent in the ion conductivity of their polymer electrolyte membrane 2, but they are clearly poor in the toughness of the same above membrane 2. In addition, the electrode structure of Comparative Example 3 in which the above X/Y in the main chain of the polymer constituting the polymer electrolyte membrane 2 is less than 2.0 is excellent in the toughness of the membrane 2, but it is clearly poor in the ion conductivity of the membrane and its power generation efficiency is also insufficient.

EXAMPLE 8

In the present example, first, 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:2:2, so as to obtain a copolymer (p:q:r=6:2:2) represented by the following formula (7):

num=1:1, so as to prepare a catalyst particle. Then, using a solution containing a perfluoroalkylene sulfonic acid polymer (e.g., Nafion (trade name) from DuPont) as an ion conducting polymer binder, the above catalyst particles were uniformly dispersed in the binder at a weight ratio of binder:carbon black=1:1, so as to prepare a catalyst paste.

Thereafter, carbon black was mixed with polytetrafluoroethylene (PTFE) particles at a weight ratio of carbon black:PTFE particle=4:6. The obtained mixture was uniformly dispersed in a solvent such as ethylene glycol to obtain a slurry. The obtained slurry was applied on the one side of the above carbon paper followed by drying it, so as to obtain a substrate layer. Then, two of the backing layers 3 were prepared, each of which consisted of the substrate layer and carbon paper.

Thereafter, the above catalyst paste was screen printed on each of the above backing layers 3, so that 0.5 mg/cm$^2$ platinum was kept thereon. Then, drying was carried out so as to prepare an electrode catalyst layer 1. Thus, a pair of electrodes were prepared, each of which consisted of the electrode catalyst layer 1 and the backing layer 3.

Thereafter, the polymer electrolyte membrane 2 was held between the electrode catalyst layers 1 of the above electrodes, and they were then hot pressed to obtain the electrode structure as shown in FIG. 1.

Subsequently, regarding the electrode structure in the present example, the oxidation resistance of the polymer electrolyte membrane 2 and the power generation efficiency of the electrode structure were evaluated.

The oxidation resistance of the polymer electrolyte membrane 2 was measured as follows. The polymer electrolyte membrane 2 was immersed for 9 hours in a 40° C. aqueous

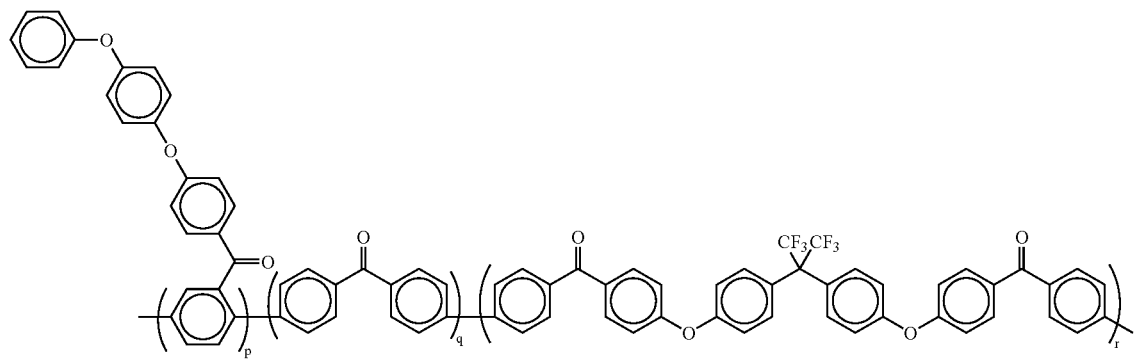

(7)

In the present example, the hydrophobic index of the above copolymer was calculated using the above formula (III), and it holds that (B/C)×(B+C)−A=(16/4)×(16+4)−6=74.

Thereafter, concentrated sulfuric acid was added to the above copolymer for sulfonation, so as to obtain a sulfonate having an ion exchange capacity of 2.0 meq/g. Thereafter, the sulfonation product of the above copolymer was dissolved in N-methylpyrrolidone to prepare a polymer electrolyte solution. A membrane was formed from the polymer electrolyte solution by casting, followed by drying in an oven, so as to prepare a membrane having a dry film thickness of 50 μm, and the membrane was used as the polymer electrolyte membrane 2.

Figure 4:
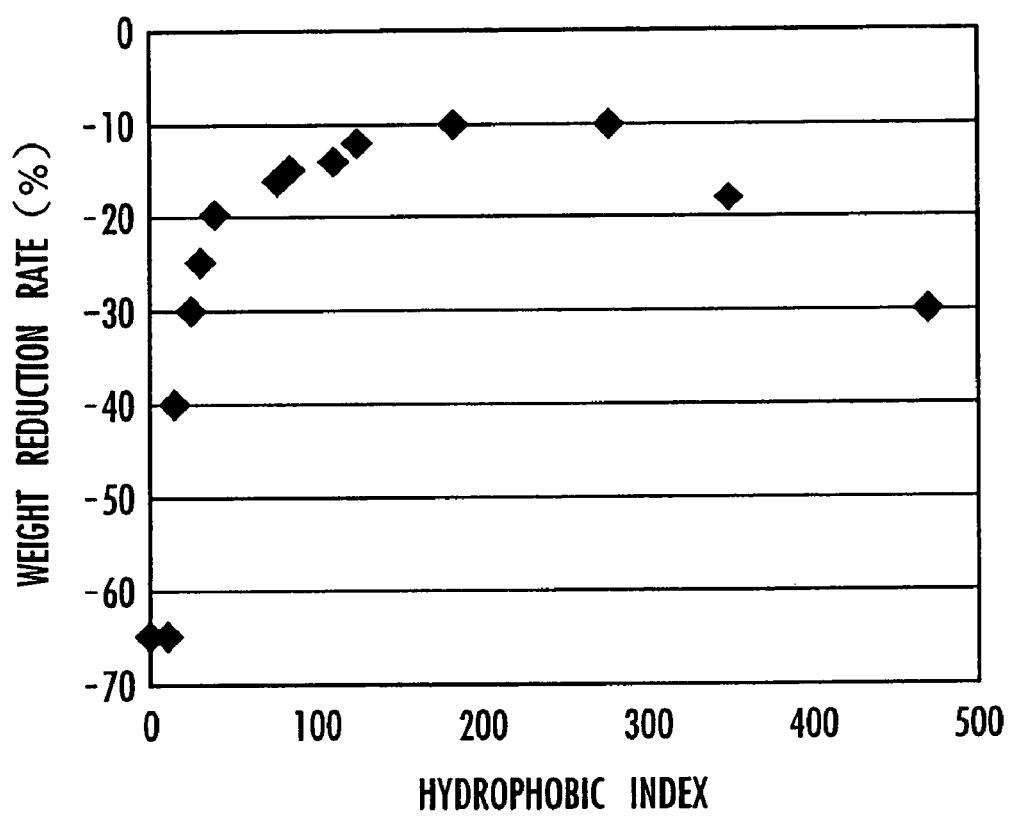
FIG. 4 is a graph showing the relationship between the hydrophobic index and the oxidation resistance of the polymer electrolyte membrane.

Subsequently, a platinum particle was supported by carbon black (furnace black) at a weight ratio of carbon black:platisolution (Fenton's reagent) containing 3% H2O2 and Fe with a concentration of 20 ppm, and then its weight reduction rate (%) was measured. The oxidation resistance was defined as such a weight reduction rate. The above weight reduction rate indicates the amount of the polymer electrolyte membrane 2 dissolved in the above reagent. The smaller the figure, the higher the oxidation resistance. The results are shown in Table 2. In addition, the relationship between the hydrophobic index and the oxidation resistance (weight reduction rate) is shown in FIG. 4.

The power generation efficiency was evaluated as follows. The above electrode structure was used for a single cell. The evaluation was carried out by supplying air to one backing layer 3 as an oxygen electrode and pure hydrogen to the other backing layer 3 as a fuel electrode, so as to generate power.

Power generation conditions were a temperature of 90° C., a relative humidity of 50% on the fuel electrode side, and a relative humidity of 80% on the oxygen electrode side. The cell voltage was measured at a current density of 0.5 A/cm$^2$. If the measured cell voltage was 0.4 V or greater, it was evaluated that the cell had a good power generation efficiency. The results are shown in Table 2.

EXAMPLE 9

In the present example, the electrode structure as shown in FIG. 1 was obtained completely in the same manner as in Example 8 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:3:1, so as to obtain a copolymer (p:q:r=6:3:1) represented by the above formula (7).

In the present example, since p:q:r=6:3:1, the hydrophobic index of the above copolymer was calculated using the above formula (III), and it holds that (B/C)×(B+C)−A=78.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 10

In the present example, the electrode structure as shown in FIG. 1 was obtained completely in the same manner as in Example 8 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:1:3, so as to obtain a copolymer (p:q:r=6:1:3) represented by the above formula (7).

In the present example, since p:q:r=6:1:3, the hydrophobic index of the above copolymer was calculated using the above formula (III), and it holds that (B/C)×(B+C)−A=80.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 11

In the present example, the electrode structure as shown in FIG. 1 was obtained completely in the same manner as in Example 8 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 5:4:1, so as to obtain a copolymer (p:q:r=5:4:1) represented by the above formula (7).

In the present example, since p:q:r=5:4:1, the hydrophobic index of the above copolymer was calculated using the above formula (III), and it holds that (B/C)×(B+C)−A=107.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 12

In the present example, the electrode structure as shown in FIG. 1 was obtained completely in the same manner as in Example 8 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 4:5:1, so as to obtain a copolymer (p:q:r=4:5:1) represented by the above formula (7).

In the present example, since p:q:r=4:5:1, the hydrophobic index of the above copolymer was calculated using the above formula (III), and it holds that (B/C)×(B+C)−A=140.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 13

In the present example, the electrode structure as shown in FIG. 1 was obtained completely in the same manner as in Example 8 with the exception that 2,5-dichloro-4'-(4-phenoxyphenoxy)benzophenone (the first repeating unit) represented by the above formula (4), 4,4'-dichlorobenzophenone (the third repeating unit), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 3:1:1, so as to obtain a copolymer (p:q:r=3:1:1) represented by the above formula (7).

In the present example, since p:q:r=3:1:1, the hydrophobic index of the above copolymer was calculated using the above formula (III), and it holds that (B/C)×(B+C)−A=37.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 14

In the present example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 9:8, so as to obtain a copolymer (p:r=9:8) represented by formula (8) indicated below. The thus obtained copolymer was used instead of the copolymer of the above formula (7). Concentrated sulfuric acid was added to the copolymer of formula (8) for sulfonation, so as to obtain a sulfonation product having an ion exchange capacity of 1.9 meq/g. Except for the above differences, the electrode structure as shown in FIG. 1 was obtained completely in the same manner as in Example 8.

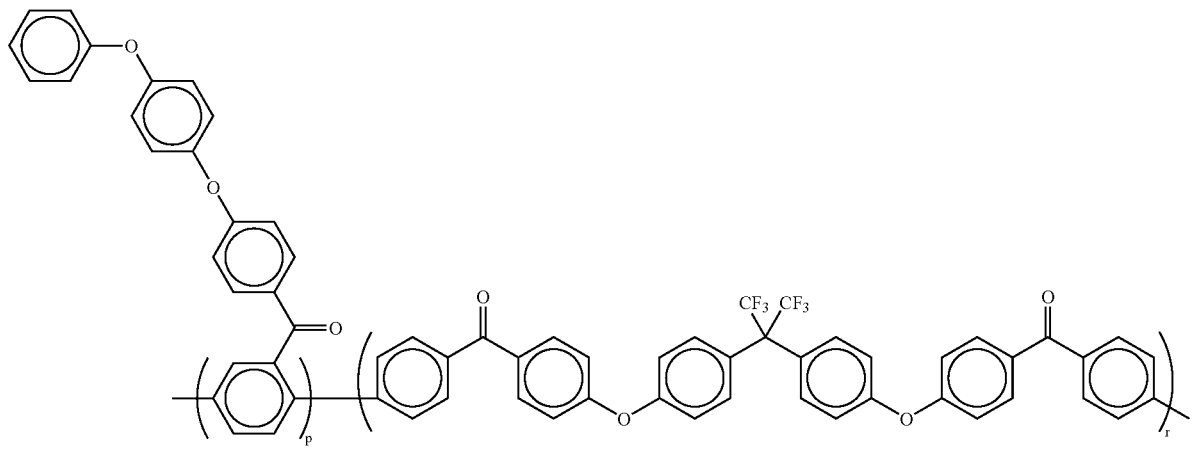

(8)

The copolymer of formula (8) corresponds to the case of q=0 in the above copolymer of formula (7). In the present example, since p:r=9:8, the hydrophobic index of the above copolymer was calculated using the above formula (III), and it holds that (B/C)×(B+C)−=183.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 15

In the present example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 9:12, so as to obtain a copolymer (p:r=9:12) represented by the above formula (8). The thus obtained copolymer was used instead of the copolymer of the above formula (7). Concentrated sulfuric acid was added to the copolymer of formula (8) for sulfonation, so as to obtain a sulfonation product having an ion exchange capacity of 2.0 meq/g. Except for the above differences, the electrode structure as shown in FIG. 1 was obtained completely in the same manner as in Example 8.

The copolymer of formula (8) corresponds to the case of q=0 in the above copolymer of formula (7). In the present example, since p:r=9:12, the hydrophobic index of the above copolymer was calculated using the above formula (III), and it holds that (B/C)×(B+C)−A=279.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

EXAMPLE 16

In the present example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 9:15, so as to obtain a copolymer (p:r=9:15) represented by the above formula (8). The thus obtained copolymer was used instead of the copolymer of the above formula (7). Concentrated sulfuric acid was added to the copolymer of formula (8) for sulfonation, so as to obtain a sulfonation product having an ion exchange capacity of 2.0 meq/g. Except for the above differences, the electrode structure as shown in FIG. 1 was obtained completely in the same manner as in Example 8.

The copolymer of formula (8) corresponds to the case of q=0 in the above copolymer of formula (7). In the present example, since p:r=9:15, the hydrophobic index of the above copolymer was calculated using the above formula (III), and it holds that (B/C)×(B+C)−A=351.

Subsequently, regarding the electrode structure in the present example, the oxidation resistance of the polymer electrolyte membrane 2 and the power generation efficiency of the electrode structure were evaluated in the same manner as in Example 8. The results are shown in Table 2 and FIG. 4.

COMPARATIVE EXAMPLE 4

In the present comparative example, the electrode structure as shown in FIG. 1 was obtained completely in the same manner as in Example 8 with the exception that polyether ether ketone represented by formula (10) indicated below was used instead of the copolymer represented by the above formula (7), and that a sulfonation product having an ion exchange capacity of 1.5 meq/g was obtained by adding concentrated sulfuric acid to the above polyether ether ketone for sulfonation.

(10)

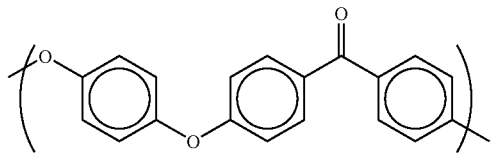

In the polyether ether ketone represented by the above formula (10), only the benzene ring present between two oxy groups that are electron releasing groups is sulfonated, but other benzene rings binding to ketone groups that are electron attracting groups are therefore not sulfonated. Thus, in the present comparative example, the number of groups to be sulfonated A=1, the number of non-sulfonated divalent aromatic residues B=2, and the number of oxy groups C=2. Accordingly, when the hydrophobic index was calculated using the above formula (I), it holds that (B/C)×(B+C)−A=(2/2)×(2+2)−1=3.

Subsequently, regarding the electrode structure in the present comparative example, the oxidation resistance of the polymer electrolyte membrane 2 and the power generation efficiency of the electrode structure were evaluated in the same manner as in Example 8. The results are shown in Table 2 and FIG. 4.

COMPARATIVE EXAMPLE 5

In the present comparative example, the electrode structure as shown in FIG. 1 was obtained completely in the same manner as in Example 8 with the exception that a polyether ether ketone copolymer represented by formula (9) indicated below was used instead of the copolymer represented by the above formula (7), and that a sulfonation product having an ion exchange capacity of 1.5 meq/g was obtained by adding concentrated sulfuric acid to the above polyether ether ketone copolymer for sulfonation.

In the polyether ether ketone copolymer represented by formula (9) indicated below, only the benzene rings of a fluorene residue represented by formula (11) indicated below are sulfonated, but other benzene rings are not sulfonated.

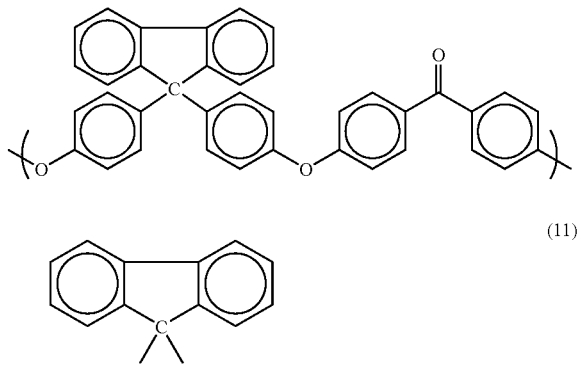

Due to steric hindrance, the above sulfonation easily occurs on the benzene rings of the side chain, but hardly occurs on any benzene ring of the main chain. As a result, although the polyether ether ketone copolymer represented by the above formula (9) comprises benzene rings binding to oxy groups that are electron releasing groups and methylene groups (which make up a part of the above fluorene residue) in the main chain thereof, the benzene rings are not sulfonated.

Thus, in the present comparative example, the number of groups to be sulfonated A=1, the number of non-sulfonated divalent aromatic residues B=4, and the number of oxy groups C=2. Accordingly, when the hydrophobic index was calculated using the above formula (I), it holds that (B/C)×(B+C)−A=(2/2)×(2+2)−1=11.

Subsequently, regarding the electrode structure in the present comparative example, the oxidation resistance of the polymer electrolyte membrane 2 and the power generation efficiency of the electrode structure were evaluated in the same manner as in Example 8. The results are shown in Table 2 and FIG. 4.

COMPARATIVE EXAMPLE 6

In the present comparative example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 9:20, so as to obtain a copolymer (p:r=9:20) represented by the above formula (8). The thus obtained copolymer was used instead of the copolymer of the above formula (7). Concentrated sulfuric acid was added to the copolymer of the above formula (8) for sulfonation, so as to obtain a sulfonation product having an ion exchange capacity of 1.9 meq/g. Except for the above differences, the electrode structure as shown in FIG. 1 was obtained completely in the same manner as in Example 8.

The copolymer of formula (8) corresponds to the case of q=0 in the above copolymer of formula (7). In the present comparative example, since p:r=9:20, the hydrophobic index of the above copolymer was calculated using the above formula (III), and it holds that (B/C)×(B+C)−A=471.

Subsequently, regarding the electrode structure in the present comparative example, the oxidation resistance of the polymer electrolyte membrane 2 and the power generation efficiency of the electrode structure were evaluated in the same manner as in Example 8. The results are shown in Table 2 and FIG. 4.

COMPARATIVE EXAMPLE 7

In the present comparative example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 1:1, so as to obtain a copolymer (p:r=1:1) represented by the above formula (8). The thus obtained copolymer was used instead of the copolymer of the above formula (7). Concentrated sulfuric acid was added to the copolymer of the above formula (8) for sulfonation, so as to obtain a sulfonation product having an ion exchange capacity of 1.9 meq/g. Except for the above differences, the electrode structure as shown in FIG. 1 was obtained completely in the same manner as in Example 8.

The copolymer of formula (8) corresponds to the case of q=0 in the above copolymer of formula (7). In the present comparative example, since p:r=1:1, the hydrophobic index of the above copolymer was calculated using the above formula (III), and it holds that (B/C)×(B+C)−A=23.

Subsequently, regarding the electrode structure in the present comparative example, the oxidation resistance of the polymer electrolyte membrane 2 and the power generation efficiency of the electrode structure were evaluated in the same manner as in Example 8. The results are shown in Table 2 and FIG. 4.

COMPARATIVE EXAMPLE 8

In the present comparative example, 2,5-dichloro-4'-(4-phenoxyphenoxy)benzophenone (the first repeating unit) represented by the above formula (4) was polymerized with 2,2-bis[4-{4-(4-chlorobenzoyl)phenoxy}phenyl]-1,1,1,3,3,3-hexafluoropropane (the second repeating unit) represented by the above formula (5) at a molar ratio of 9:1, so as to obtain a copolymer (p:r=9:1) represented by the above formula (8). The thus obtained copolymer was used instead of the copolymer of the above formula (7). Concentrated sulfuric acid was added to the copolymer of the above formula (8) for sulfonation, so as to obtain a sulfonation product having an ion exchange capacity of 1.9 meq/g. Except for the above differences, the electrode structure as shown in FIG. 1 was obtained completely in the same manner as in Example 8.

The copolymer of formula (8) corresponds to the case of q=0 in the above copolymer of formula (7). In the present comparative example, since p:r=9:1, the hydrophobic index of the above copolymer was calculated using the above formula (III), and it holds that (B/C)×(B+C)−A=15.

Subsequently, regarding the electrode structure in the present comparative example, the oxidation resistance of the polymer electrolyte membrane 2 and the power generation efficiency of the electrode structure were evaluated in the same manner as in Example 8. The results are shown in Table 2 and FIG. 4.

COMPARATIVE EXAMPLE 9

In the present comparative example, 2,5-dichloro-4'-(4-phenoxyphenoxy)benzophenone (the first repeating unit) represented by the above formula (4), polyether ether ketone represented by the above formula (9), and 2,2-bis[4-{4-(4-chlorobenzoyl)phenoxy}phenyl]-1,1,1,3,3,3-hexafluoropropane (the second repeating unit) represented by the above formula (5) were polymerized at a molar ratio of 6:2:1, so as to obtain a copolymer represented by formula (12) indicated below. The thus obtained copolymer was used instead of the copolymer of the above formula (7). Concentrated sulfuric acid was added to the copolymer of the above formula (12) for sulfonation, so as to obtain a sulfonation product having an ion exchange capacity of 2.0 meq/g. Except for the above differences, the electrode structure as shown in FIG. 1 was obtained completely in the same manner as in Example 8.

In the copolymer represented by the above formula (12), sulfonation occurs only on the benzene rings of the side chain of the first repeating unit. The third repeating unit also comprises a benzene ring that intervenes between two oxy groups that are electron releasing groups. However, as described above, since sulfonation easily occurs on the benzene rings of the side chain, but hardly occurs on any benzene ring of the main chain due to steric hindrance, the benzene ring of the third repeating unit is not sulfonated.

Thus, in the present comparative example, the number of groups to be sulfonated A=1×6=6, the number of nonsulfonated divalent aromatic residues B=3×2+6×1=12, and the number of oxy groups C=2×2+2×1=6. Accordingly, when the hydrophobic index was calculated using the above formula (I), it holds that (B/C)×(B+C)−A=(12/6)×(12+6)−6=30.

Subsequently, regarding the electrode structure in the present comparative example, the oxidation resistance of the polymer electrolyte membrane 2 and the power generation efficiency of the electrode structure were evaluated in the same manner as in Example 8. The results are shown in Table 2 and FIG. 4.

TABLE 2

| | A | B | C | Hydrophobic index | Weight reduction rate (%) | Power generation efficiency |
|---|---|---|---|---|---|---|
| Example 8 | 6 | 16 | 4 | 74 | 16 | G |
| Example 9 | 6 | 12 | 2 | 78 | 15 | G |
| Example 10 | 6 | 20 | 6 | 80 | 15 | G |
| Example 11 | 5 | 14 | 2 | 107 | 14 | G |
| Example 12 | 4 | 16 | 2 | 140 | 12 | G |
| Example 13 | 3 | 8 | 2 | 37 | 20 | G |
| Example 14 | 9 | 48 | 16 | 183 | 10 | G |
| Example 15 | 9 | 72 | 24 | 279 | 10 | G |

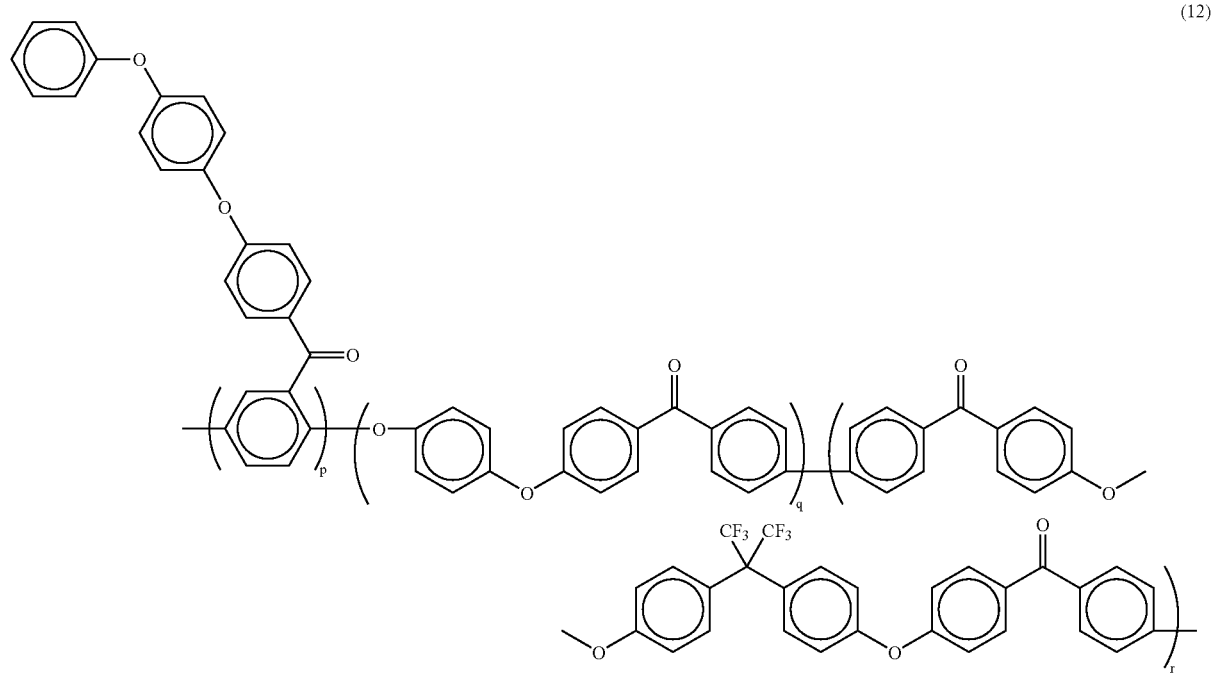

(12)

p/q/r = 6:2:1

TABLE 2-continued

| | A | B | C | Hydrophobic index | Weight reduction rate (%) | Power generation efficiency |
|---|---|---|---|---|---|---|
| Example 16 | 9 | 90 | 30 | 351 | 18 | G |
| Comparative Example 4 | 1 | 2 | 2 | 3 | 65 | G |
| Comparative Example 5 | 1 | 4 | 2 | 11 | 65 | G |
| Comparative Example 6 | 9 | 120 | 40 | 471 | 30 | P |
| Comparative Example 7 | 1 | 6 | 2 | 23 | 30 | G |
| Comparative Example 8 | 9 | 6 | 2 | 15 | 40 | G |
| Comparative Example 9 | 6 | 12 | 6 | 30 | 25 | G |

Power generation efficiency:
G . . . A cell voltage of 0.4 V or greater at a current density of 5 A/cm$^2$
P . . . A cell voltage of less than 0.4 V at a current density of 5 A/cm$^2$ Table 2 and FIG. 4 clearly show that Examples 8 to 16 in which the hydrophobic index is within the range between 35 to 380 have a small weight reduction rate resulting in an excellent oxidation resistance, and an excellent power generation efficiency. In contrast, both Comparative Examples 4, 5, and 7 to 9 in which the hydrophobic index is less than 35 and Comparative Example 6 in which the hydrophobic index exceeds 380 have a large weight reduction rate, and therefore they cannot obtain a sufficient oxidation resistance. Moreover, they are poor in power generation efficiency.

When the hydrophobic index exceeds 380 as in the case of Comparative Example 6, if the amount of repeating units comprising non-sulfonated divalent aromatic residues is excessive to the amount of repeating units comprising groups to be sulfonated, the length of a main chain lengthens. As a result, it is considered that association or agglutination of molecules takes place actively, and that oxidation resistance decreases.

INDUSTRIAL APPLICABILITY

The present invention can be used for a polymer electrolyte fuel cell, which is used in vehicles and the like.

The invention claimed is:

1. An electrode structure for a polymer electrolyte fuel cell, comprising:
   a pair of electrode catalyst layers, and
   a polymer electrolyte membrane held between the electrode catalyst layers,
   said polymer electrolyte membrane comprising a sulfonation product of a polymer, wherein said polymer comprises a main chain having a plurality of divalent aromatic residues bound to one another directly or through oxy groups or divalent groups other than aromatic residues, and side chains comprising sulfonated aromatic groups, and
   wherein the number of divalent aromatic residues comprised in the main chain of said polymer is denoted by X, the number of oxy groups comprised in the main chain of said polymer is denoted by Y, and the value X/Y is within the range of from 2.0 to 9.0.

2. The electrode structure for a polymer electrolyte fuel cell according to claim 1, wherein the number of sulfonated aromatic groups is denoted by A, the number of non-sulfonated divalent aromatic residues is denoted by B, the number of oxy groups is denoted by C with respect to the total groups comprised in the main chain of said polymer, and the value (B/C)×(B+C)−A is within the range of from 35 to 380.

3. The electrode structure for a polymer electrolyte fuel cell according to anyone of claims 1 and 2, wherein the main chain of said polymer comprises a first repeating unit represented by the following general formula (1) and a second repeating unit represented by the following general formula (2):

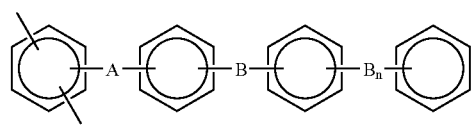

(1)

wherein A represents an electron attracting group, B represents an electron releasing group, n is an integer of 0 or 1, and a benzene ring includes benzene and derivatives thereof, and

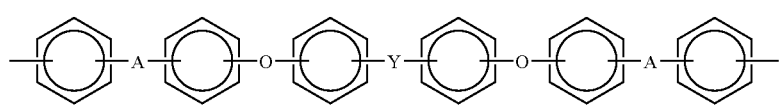

(2)

wherein A represents an electron attracting group, Y represents —C(CF$_3$)$_2$— or —SO$_2$—, and a benzene ring includes benzene and derivatives thereof.

4. The electrode structure for a polymer electrolyte fuel cell according to anyone of claims 1 and 2, wherein the main chain of said polymer comprises a first repeating unit represented by the following general formula (1), a second repeating unit represented by the following general formula (2), and a third repeating unit represented by the following general formula (3):

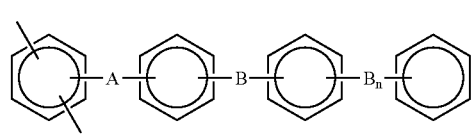

(1)

wherein A represents an electron attracting group, B represents an electron releasing group, n is an integer of 0 or 1, and a benzene ring includes benzene and derivatives thereof,

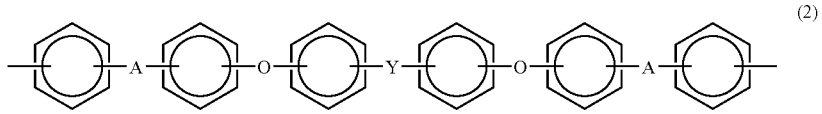

(2)

wherein A represents an electron attracting group, Y represents —C(CF$_3$)$_2$— or —SO$_2$—, and a benzene ring includes benzene and derivatives thereof, and

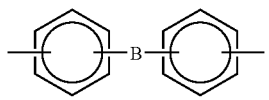

(3)

wherein B is an electron releasing group.

5. A polymer electrolyte fuel cell comprising: an electrode structure comprising a pair of electrode catalyst layers and a polymer electrolyte membrane held between the electrode catalyst layers, said polymer electrolyte membrane comprising a polymer comprising a main chain, in which a plurality of divalent aromatic residues are bound to one another directly or through oxy groups or divalent groups other than aromatic residues, and side chains comprising sulfonated aromatic groups, wherein the number of divalent aromatic residues comprised in the main chain of said polymer is denoted by X, the number of oxy groups comprised in the main chain of said polymer is denoted by Y, and the value X/Y is within the range of from 2.0 to 9.0, and wherein electric power is generated when an oxidizing gas is supplied to one side of said electrode structure and a reducing gas is supplied to another side of said electrode structure.

6. The polymer electrolyte fuel cell according to claim 5, wherein the number of sulfonated aromatic groups is denoted as A, the number of non-sulfonated divalent aromatic residues is denoted as B, the number of oxy groups is denoted as C with respect to the total groups comprised in the main chain of said polymer, and the value (B/C)×(B+C)−A is within the range of from 35 to 380.

7. The polymer electrolyte fuel cell according to claim 5, wherein the number of sulfonated aromatic groups is denoted as A, the number of nonsulfonated divalent aromatic residues is denoted as B, the number of oxy groups is denoted as C with respect to the total groups comprised in the main chain of said polymer, and the value (B/C)×(B+C)−A is within the range of from 35 to 380.

* * * * *